US009143583B1

(12) United States Patent
Brockway

(10) Patent No.: US 9,143,583 B1
(45) Date of Patent: Sep. 22, 2015

(54) FIXED STATION INTERFACE FOR LEGACY BASE STATION EQUIPMENT

(71) Applicant: U.S. Department of Homeland Security, Washington, DC (US)

(72) Inventor: Richard Brockway, Ellicott, MD (US)

(73) Assignee: The United States of America, as Represented by the Secretary, Department of Homeland Security, Washington, DC (US)

( * ) Notice: Subject to any disclaimer, the term of this patent is extended or adjusted under 35 U.S.C. 154(b) by 7 days.

(21) Appl. No.: 14/246,553

(22) Filed: Apr. 7, 2014

(51) Int. Cl.
*H04L 12/54* (2013.01)
*H04L 29/06* (2006.01)

(52) U.S. Cl.
CPC ...................................... *H04L 69/08* (2013.01)

(58) Field of Classification Search
CPC ........................................................ H04L 12/54
USPC .................. 370/310–350, 419–421, 465–476
See application file for complete search history.

(56) References Cited

U.S. PATENT DOCUMENTS

| 5,392,283 A | 2/1995 | Bocci et al. |
| 7,391,760 B1 * | 6/2008 | Caldwell et al. ............... 370/352 |
| 2003/0169717 A1 * | 9/2003 | Reitmeier et al. ............. 370/338 |
| 2006/0129693 A1 * | 6/2006 | LeCroy et al. ................ 709/231 |
| 2008/0031275 A1 * | 2/2008 | Janky et al. .................... 370/466 |
| 2014/0022993 A1 * | 1/2014 | Jacobs .......................... 370/328 |

* cited by examiner

*Primary Examiner* — Ricky Ngo
*Assistant Examiner* — Wei-Po Kao
(74) *Attorney, Agent, or Firm* — Lavanya Ratnam; William Washington; Nathan Grebasch

(57) ABSTRACT

An interface device for provisioning Internet Protocol (IP) communications to be established for base station equipment that employ proprietary device specific protocols. A fixed station interface (FSI) translates between a V.24 High-Level-Data-Link Control (HDLC) protocols used for external data connections on base station equipment to a Voice-Over-Internet-Protocol (VOIP) open-standard protocol. Upon being deployed in First Responder communications networks (that use legacy base station equipment), the FSI provisions for the retention of existing installed base station equipment while providing a low cost solution to support VOIP communications interconnectivity and reliability, thereby enhancing the effectiveness and safety of the First Responder systems.

19 Claims, 6 Drawing Sheets

FIXED STATION INTERFACE FOR LEGACY BASE STATION EQUIPMENT

FIELD

Embodiments disclosed herein generally relate to an interface that converts a proprietary communication protocol to a Voice-over-Internet-Protocol (VoIP) open standard protocol.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Numerous legacy base stations are deployed in radio communications systems utilized by federal, state and local first responder organizations. Such public safety radio communications rely on large quantities of legacy base station equipment that employ proprietary interface protocols, thereby limiting the ability of the organizations to choose equipment from multiple vendors. Furthermore, the base stations cannot be connected on Internet-Protocol (IP) based networks. The Telecommunications Industry Association (TIA) established an open standard (TIA-102.BAHA and Draft TIA-102.BAHA-A) for interconnecting fixed station equipment (base stations) to dispatch consoles and other infrastructure equipment. For the most part, the installed legacy base station equipment do not support this open standard.

SUMMARY

In order for First Responder organizations to utilize legacy base station equipment, which does not support open standard IP communication, an interface as described below in the Detailed Description of Embodiments enhances the communication systems' reliability and increases the effectiveness and safety of the First Responder organization.

A fixed station interface (FSI) of the present disclosure is an external interface unit, which allows Internet Protocol communications to be established for legacy base station equipment. In an exemplary embodiment, the FSI translates between a V.24 High-Level Data Link Control ("HDLC") protocol (commonly implemented by base stations) used for external data connection on the base station to a VoIP open-standard protocol contained in the TIA-102.BAHA and Draft TIA-102.BAHA-A "Project 25 Fixed Station Interface Messages and Procedures", which is incorporated by reference herein. Specifically, the FSI is an interface unit that converts from proprietary external communications protocols used by, for example, legacy base stations to an IP-based protocol. Furthermore, the FSI can be configured to translate between other proprietary adaptations of the HDLC protocol (or the like) to a VoIP based open standard protocol.

The features supported by the FSI include individual and group calls for both encrypted and unencrypted voice, analog conventional calls, radio control messaging as well as remote control operation of the connected base station. The FSI also incorporates features from the draft TIA-102.BAHA-A standard which include packet data and individual Internet Protocol addresses for voice, data and control.

Thus, the application of the FSI to a First Responder communication system produces benefits such as: existing proprietary communication systems can be quickly transitioned to IP-based systems at a very low cost, which allows the base station equipment to be retained and not replaced thereby saving precious funds for other purposes. Dispatch consoles (described herein as a central facility that is connected to one or more base stations and that allows an operator to communicate with individual radio units via the base stations or to set up interconnections between radio units) can be purchased competitively with the console that best meets the first responder organizations needs being selected and not being a sole-source proprietary solution.

Transitioning to an Internet Protocol based communication system provides interoperability and interconnectivity that is unprecedented in public safety communications. Thus, the safety and effectiveness of the First Responder systems will be enhanced. The application of an open standard Internet Protocol to First Responder communications systems results in a major advance in the interoperability, interconnectivity and effectiveness, thereby supporting calls to be interconnected between users in widely separated locations using communications systems in different operating frequency bands utilizing different radio manufacturer's equipment. In the event of a disaster that destroys parts of the communications system, calls can be automatically rerouted or handled by alternate dispatch centers. Further, interoperability between users on communications systems from different manufacturers is assured.

Accordingly, there is a requirement for the First Responder organizations to support IP communication in order to enhance the communication systems' reliability and increase the effectiveness and safety of the First Responder organization.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

Various embodiments of this disclosure that are proposed as examples will be described in detail with reference to the following figures, wherein like numerals reference like elements, and wherein.

DETAILED DESCRIPTION OF EMBODIMENTS

In the following description, reference is made to the accompanying drawings which illustrate several embodiments of the present invention. It is understood that other embodiments may be utilized and mechanical, compositional, structural, electrical, and operational changes may be made without departing from the spirit and scope of the present disclosure. The following detailed description is not to be taken in a limiting sense, and the scope of the embodiments of the present invention is defined only by the accompanying claims.

Some portions of the detailed description which follows may be presented in terms of procedures, steps, logic blocks, processing, and other symbolic representations of operations on data bits that can be performed on computer memory. A procedure, computer executed step, logic block, process, etc., are here conceived to be a self-consistent sequence of steps or instructions leading to a desired result. The steps are those utilizing physical manipulations of physical quantities. These quantities can take the form of electrical, magnetic, or radio signals capable of being stored, transferred, combined, compared, and otherwise manipulated in a computer system. These signals may be referred to at times as bits, values, elements, symbols, characters, terms, numbers, or the like. Each step may be performed by hardware, software, firmware, or combinations thereof.

Figure 1:
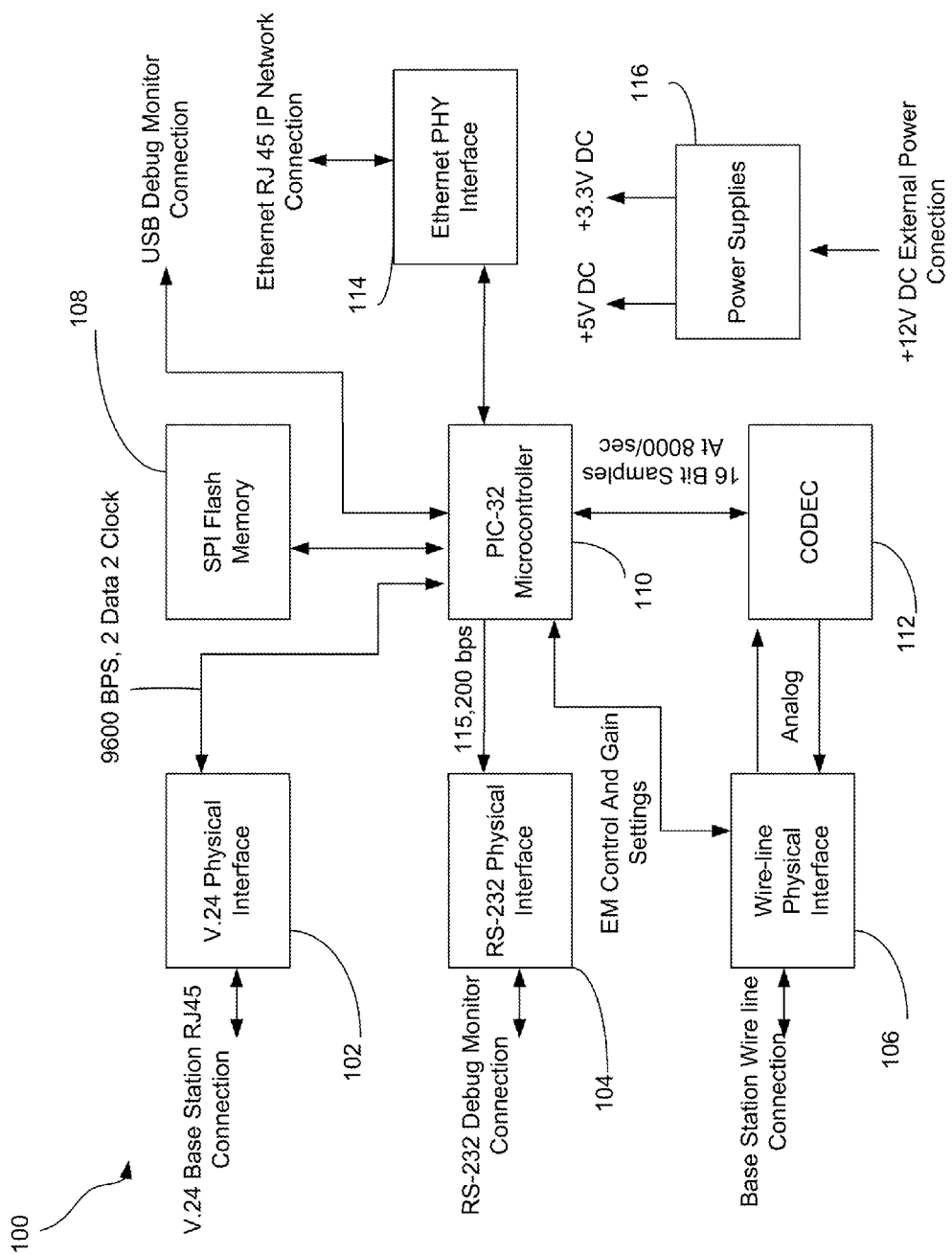
FIG. 1 depicts a hardware block diagram of a fixed station interface (FSI) according to an embodiment.

FIG. 1 depicts a hardware block diagram 100 of a fixed station interface (FSI) according to an embodiment.

The FSI 100 includes a power supply 116 which takes as input a 12 volt DC external power. The input 12V power is filtered and a DC-DC converter drops the voltage down to 5 volts. Further, the power supply also includes a linear voltage regulator that further drops the voltage to 3.3 Volts. The filtered 12V, 5V and 3.3V levels are supplied to the individual circuits of the FSI as required.

A physical interface 102 is connected on one side to a fixed base station such as a QUANTAR™, GTR 800 or the like via an RJ45 connection. The physical interface 102 can be in an exemplary embodiment a V.24 synchronous serial interface that converts voltage levels used by the V.24 to the logic levels used by a microcontroller 110. Specifically, the V.24 includes two data lines and two clock lines (one for each direction, incoming and outgoing). The voltage level used is approximately +/−8 Volts. A level shifter converts these voltages to CMOS voltage levels suitable for the microcontroller 110 interface.

An RS-232 physical interface 104 is a serial interface that converts the logic level signals used by the microcontroller 110 to voltage levels that are required for communication with external devices using the RS-232 protocol. The RS-232 port can be used for communications with legacy base station equipment, for debug monitoring purposes or may be left idle. The voltage levels used on the RS-232 debug output are approximately +/−8 Volts. A level shifter converts this to CMOS voltage levels for the microcontroller 110 interface. Communication between the microcontroller 110 and the RS-232 physical interface occur at 115,200 bits per second.

The FSI hardware 100 also includes a wireline physical interface 106. Analog signals are sent to and from the wireline connection. Amplifiers are provided in each direction to adjust the voltage levels. The gains of these amplifiers are remotely controlled and set via a Web Page. Additionally, E (Ear) and M (Mouth) signaling is present on this interface to indicate the presence of a receive signal or the requirement to transmit an analog signal. The external voltage levels are converted to CMOS voltage levels suitable for the microcontroller 110 interface.

The analog wireline signals are converted to and from digital signals by a coder-decoder (CODEC) 112. Specifically, the conversion is performed at a crystal controlled rate of 8,000 conversions per second and also serves as a timing reference for the FSI. The samples of the CODEC are obtained at a resolution of 16 bits. The FSI may also include a secondary port that is configured to initialize the CODEC 112.

The FSI architecture 100 further includes a Microchip 110 microcontroller running at an internal clock rate of 80 MHz. The Microchip 100 can be implemented as a PIC 32 microcontroller configured using an internal firmware program stored in non-volatile flash memory. This program memory can be updated via Internet Protocol under control of a Boot Program that should not be capable of being updated remotely. Configuration data can also be stored in non-volatile flash program memory. Specifically, the firmware may be divided into a boot-loader stored in the boot section of the flash memory and a program stored in the Program Space in the Flash Memory. The boot-loader can be a fixed image while the program image that can be remotely changed by the boot-loader, can be an authenticated program image that has been uploaded over TCP/IP to an external SPI Flash Memory 108.

The SPI Flash Memory 108 may be a flash memory of 32 megabits, and can be used to store web-pages for, among other things, controlling the FSI and serve as a temporary storage location for firmware and web page uploaded files.

Furthermore, the FSI architecture 100 may also include an Ethernet PHY Interface 114 that provides signal levels and management functions required for a 100 Base T Ethernet port used for communications to an IP network. Additionally, the microcontroller 110 may communicate with a USB port that is included for communications with legacy base station equipment, for debug monitoring purposes or the like. The USB can operate in a host of device mode as needed by the external USB connection.

Figure 2:
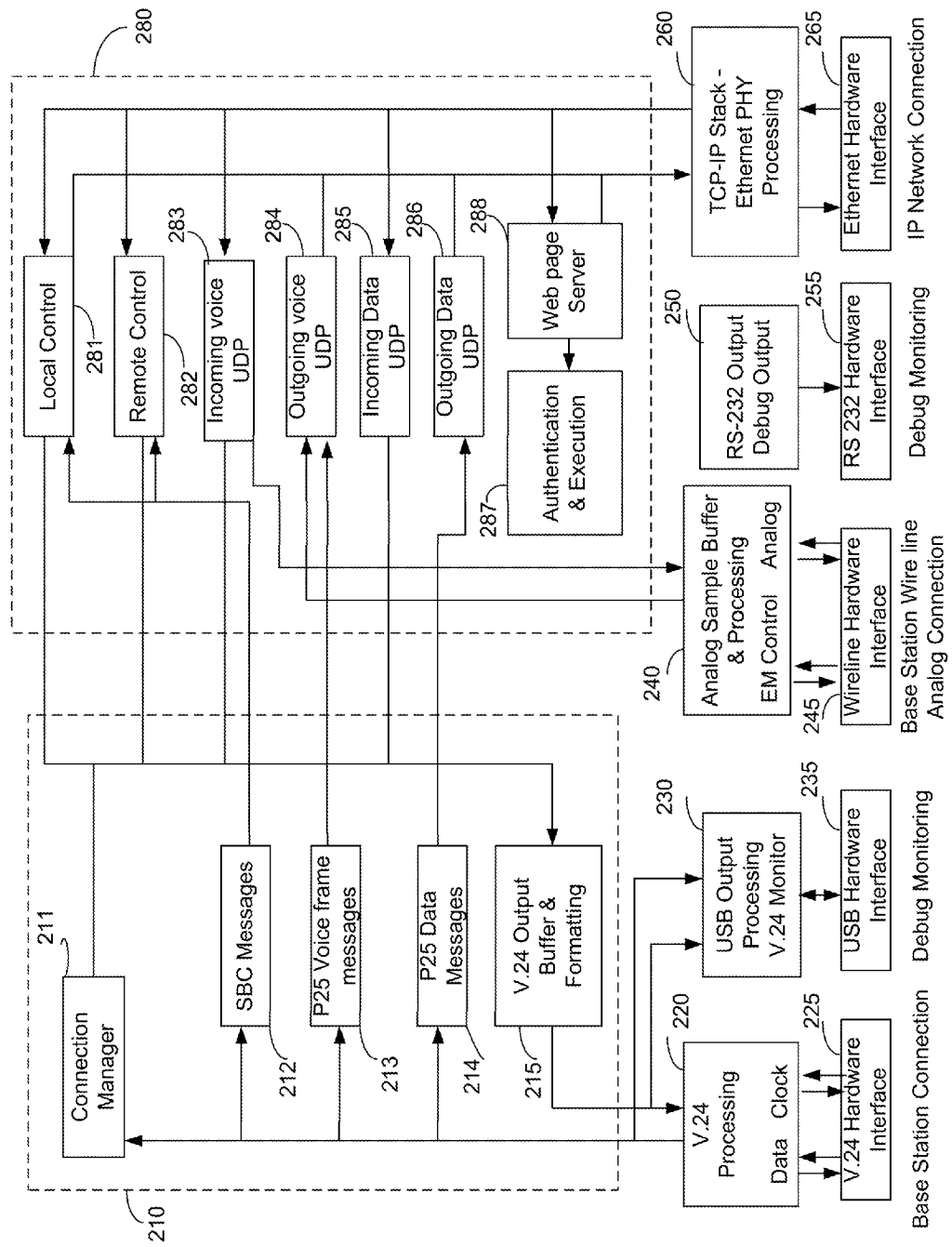
FIG. 2 illustrates a block diagram of FSI firmware.

FIG. 2 depicts a block diagram of the FSI firmware that is included in the PIC-32 microcontroller. The firmware includes V.24 processing circuitry 210 and TCP/IP processing circuitry 280. A plurality of hardware interfaces 225, 235, 245, 255 and 265 are also included that communicate with the V.24 and TCP/IP processing circuitry 210 and 280, respectively.

The V.24 Clock/Data processing unit 220 has one clock signal in and one clock signal out. Each clock is sampled on a frequent basis to determine if the clocks have changed a logic state. If an appropriate edge of the clock signal is observed, the associated data line is correspondingly sampled. The data samples are accumulated in a register for each data direction. The V.24 port utilizes a standard RJ-45 eight pin connector. As stated previously, there are two clock signals, each operating at 9600 Hertz and two data signals (one clock and one signal connection for each direction). The voltage levels for the above signals are nominally maintained at +/−8 volts. The data transfer protocol used on the V.24 port is HDCL.

Characteristics of the HDLC protocol include: Bit stuffing, a property in which the transmitter inserts an extra "0" bit into the data communications stream after sending five "1" bits in a row. This enables the receiver to appropriately discard the extra "0" bit. The HDLC protocol incorporates framing, a property by which the sender transmits a "0" bit followed by 6 "1" bits and then a "0" bit (represented as 0x7E in hexadecimal notation). This distinctive pattern cannot be mistaken for data due to the bit stuffing used for data. The pattern is used when no data is being transmitted (i.e., idle pattern). The receiver knows that the first data character transmitted after the idle pattern is the start of the HDCL frame. When the transmitter is through sending data, the idle or flag pattern is sent again signaling the completion of the message. Further, the HDLC protocol includes a Cyclic Redundancy Check (CRC) consisting of two bytes, which is calculated across the entire message using a CCR-CCITT calculation method and is inserted at the end of the message.

The V.24 processing unit 220 receives data from the V.24 hardware interface 225 and applies "bit stuffing/un-stuffing" to adjust the data stream and to detect "idle/frame" (0x7E) data. The '0x7E' is used to signal no activity on the link or the end of a message. The first non-0x7E data following a 0x7E byte signals the start of a new message. The data for each direction is passed to a second routine in each data direction to accumulate a completed message. The received completed messages are supplied to a main loop processing (to be described later with reference to FIG. 3) as soon as they are received and are also supplied to the USB Output Processing used to monitor the V.24 traffic. In the transmit direction, a routine sends one bit at a time to the V.24 in synchronism with the V.24 interface that is generated 9600 Hz clock. The sent data is read from a circular buffer and accessed by each routine using the V.24 transmit function.

A USB output processing unit 230 communicates with a USB hardware interface 235 for debugging/monitoring purposes. The USB output processing unit 230 is a stack function from a Microchip USB library. Long USB messages are managed by the stack and are sent using an interrupt generated as needed in the main timing loop. Further, the use of the USB may require loading a special USB driver(s) on a monitor computer.

An analog sample buffer and processing unit 240 communicates with a wireline hardware interface 245. Digital signals sent to and from the hardware codec are transmitted/received at 8,000 samples per second. The analog sample buffer and processing unit 240 includes two circular buffers which are indexed in accordance with either internally generated time stamps or externally received time stamps. This feature provisions for a limited amount of tolerance for sample frames being received out of order and also provides an adjustable delay.

An RS-232 output processing unit 250 communicates with an RS 232 hardware interface 255. According to one embodiment, the RS-232 output processing unit 250 includes a PIC-32 hardware buffer for its output. The output data rate from the PIC-32 microcontroller to the RS-232 output processing unit is 115,200 bits per second. Additionally, all firmware modules provide some form of a status indication to the RS-232 debug port.

The TCP/IP stack-Ethernet PHY processing unit 260 is connected to an Ethernet hardware interface 265, and includes a standard Microchip TCP/IP stack used for connection (of the legacy base station interface) to an external IP network.

In what follows, a detailed description of the V.24 processing circuitry 210 and the TCP/IP processing circuitry 280 of the FSI firmware is provided.

The V.24 processing circuitry 210 includes a connection manager module 211, a single block control message module 212, a project 25 voice message module 213, a project 25 data message module 214, and a V.24 output buffer and formatting module 215.

The connection manager module 211 processes short messages received from the V.24 interface and provide an appropriate response to indicate that the V.24 link is connected and active. The responses are sent to the V.24 output buffer and formatting module 215 to be sent out on the V.24 interface.

Single block control (SBC) messages are a subset of Project 25 trunking control messages and are used for radio control in non-trunked systems. Messages that are received from the V.24 port and that are recognized to be SBC messages are sent by the SBC module 212 to the TCP/IP Local 281 or remote control 282 processing modules respectively. SBC messages are also used in several dispatch console and radio control procedures.

Messages that are received from the V.24 processing module 220 and that are recognized to be parts of a Project 25 voice frame (including Header Data Units) are sent by the P25 voice processing module 213 to the TCP/IP processing module (outgoing voice UDP module, 284) for passing on to the external IP connected equipment.

Messages that are received from the V.24 processing module 220 and that are recognized to be data messages (confirmed, unconfirmed or response packets) are accumulated in a buffer until the entire message is received. Once the message is complete, the message is sent to the TCP/IP processing, outgoing data UDP processing module 286 to send on to an IP connected equipment.

The V.24 output buffer and formatting module 215 includes a circular buffer to store messages that are to be sent out on the V.24 interface. Each message is sent out at a rate of 9600 bits per second rate and is erased once sent. When there are no messages present in the buffer, an idle pattern (0x7E) is transmitted. Note that the pattern 0x7E is sent between messages to mark the end of the last message or to indicate the start of the next message.

The TCP/IP processing circuitry 280 includes a local control processing module 281, a remote control processing module 282, an incoming user datagram protocol (UDP) voice processing module 283, an outgoing UDP processing module 284, an incoming UDP data processing module 285, an outgoing UDP data processing module 286, an authentication module 287 and a web-page server module 288.

The local control processing module 281 receives a connect command from a dispatch console and manages the connecting and messaging (including SBC messages) to/from the dispatch console. A dispatch console is defined herein as a central facility that is connected to one or more base stations and which allows the operator to communicate with individual radio units via the base stations or to set up interconnections between radio units. The local control processing module 281 can accept both version 1 (TIA-102.BAHA) and version 2 (draft TIA-102.BAHA-A) messaging including different IP addresses for control, voice and data messages.

According to an embodiment, the FSI is capable of being operated in an autonomous mode wherein the FSI can support VoIP connections without the requirement of a dispatch console. Thus, the FSI can appear to act as a legacy base station when connected to a legacy network that facilitates use of open standard VOW connections.

The remote control processing module 282 enables the FSI to operate in autonomous mode, wherein the FSI establishes connections automatically without the involvement of a dispatch console. The remote control processing module 282 can generate both version 1 (TIA-102.BAHA) and version 2 (draft TIA-102.BAHA-A) messaging including different IP addresses for control, voice and data messages.

The incoming voice UDP processing module 283 receives incoming UDP packets from externally connected equipment. When the UDP processing module 283 receives UDP packets containing voice data (Project 25 or analog pulse code modulation (PCM)) the UDP packet is stored, processed and passed to the V.24 output buffer and formatting module 215, in the case of Project 25 or to the analog sample buffer and processing module 240, in the case of analog PCM. Further, the base station transmitter can be keyed up to transmit an acknowledgement message back to the IP connected equipment.

The outgoing voice UDP processing module 284 receives messages (to be translated to UDP) from the P25 voice message module 213. Specifically, if a project 25 voice message is received on the V.24 interface 225, it is passed to the outgoing voice UDP processing module 284 for formatting (and transmission) into a UDP packet. Furthermore, if an external signal such as a PTT (M lead) signal or the like is received on the wireline interface 245, the PCM samples from the analog sample buffer module 240, are formatted and sent out on a UDP packet. Note that both packet types (project 25 and PCM) can include a locally generated sample number, time stamp and synchronization source indicator.

The incoming data UDP processing module 285 is configured to receive a UDP packet from external equipment. When a UDP packet containing either confirmed, unconfirmed or a response packet data is received, the packet is stored in a buffer and when the entire message is received, it is formatted and sent to the V.24 output buffer and formatting module 215 for transmission out on the V.24 port 225.

The outgoing data UDP processing module 286 receives messages from the P25 data message module 214. Specifically, when a data message is recognized as being received on the V.24 port 225, the outgoing data UDP processing module 286 formats the message into a single UDP packet and transmits the data packet to external equipment.

According to an embodiment, the FSI interface includes a web-page server module 288 and an authentication and execution module 287. These modules provide the firmware an ability to upload web-pages in a remote manner. Specifically, a HTTP server can be included in the program firmware. The server provides a series of web pages for set-up and monitoring of the interface. The web-server module 288 provisions for the ability to upload new web pages or firmware via the Internet Protocol connection. The upload process can be password protected. Once a file is uploaded, a 256 bit authentication code can be required for uploading. If the uploaded authentication code matches the value calculated using a keyed SHA-2 across the entire firmware file, the firmware will be uploaded to the web page of firmware memory as appropriate. If the uploaded value does not match the locally calculated value, the upload is discarded. In doing so, a strong authentication of the firmware and verification of its integrity is provided. Note that web-pages can be simply transferred from one region in the SPI flash memory to another. Further, a firmware update invokes the Boot Loader firmware which reads the hexadecimal file from the SPI Flash memory and writes it to the non-volatile memory in the PIC32 microcontroller (110 in FIG. 1).

Figure 3A:
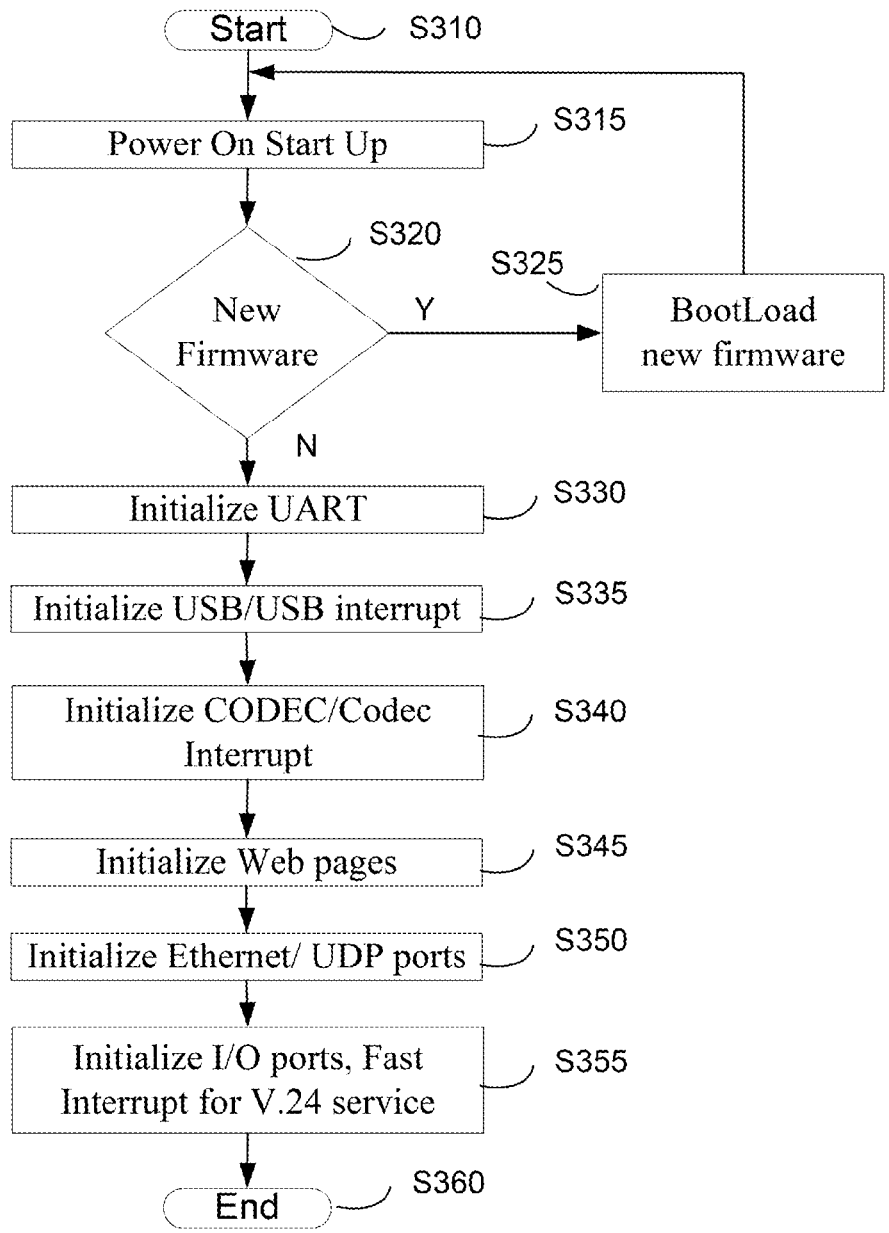
FIG. 3A is a flowchart outlining an initialization process performed by the firmware of FIG. 2

FIG. 3A is a flowchart outlining an initialization process performed by the firmware according to an embodiment.

The process starts in step S310 and proceeds to step S315. In step S315, upon initial powering (power ON), the firmware is initialized to a power-on start up state.

In step S320, a query is made to determine if a new firmware is available to be downloaded to the microcontroller. For instance, a flag bit can be verified to check if it is set to a predetermined value. If the response to the query is affirmative, the process moves to step S325. If the response to the query is negative, the process moves to step S330.

In step S325, the process installs the new firmware via a boot-loader. In the firmware update mode, previously authenticated updated firmware stored in an external SPI flash memory is read into the boot load program and is used to re-flash the contents of the microcontroller program memory. Upon reaching the end of the firmware update file as indicated by a data stored in a block of program memory, the contents of the particular sector of program memory is erased and the microcontroller is restarted (the process loops back to step S315). Once the firmware update has been accomplished and the sector indicating the firmware update has been erased, the microcontroller operates normally using the updated firmware.

In step S330, the microcontroller's universal asynchronous receiver/transmitter hardware (UART) is initialized to the data rate and format required to communicate with a legacy base station equipment utilizing the UART communications. Note that if the connected legacy base station equipment does not require the UART, the UART can be used for debug and monitoring purposes or may be even left idle.

In step S335, a Universal Serial Bus (USB) is then initialized and a hardware interrupt is enabled to support USB communications. Depending on the requirements for the legacy base station equipment, the USB can be configured to operate as a USB Host, a USB device, or be used for debugging/monitoring purposes or be left idle.

In step S340, hardware CODEC and an associated hardware interrupt is initialized. The CODEC is used to convert analog inputs and outputs from/to digital formats. The interrupt is set for an 8,000 sample per second rate to support standard PCM voice requirements. The microcontroller uses a serial peripheral interface (SPI) for reading and writing data from and to the CODEC and a separate SPI channel to initialize the CODEC device.

In step S345, the web pages stored in a reserved sector of the hardware SPI Flash device are initialized.

The process then proceeds to step S350, wherein Ethernet I/O ports are initialized and UDP ports are initialized for Ethernet communications. The specific IP address and UDP ports can be set as program default values or can be read from the SPI Flash.

In step S355, the process sets the I/O port specific to the legacy base station equipment hardware interface. For instance if the V.24 interface is used, a fast time based interrupt is enabled. The fast interrupt can be used to sample the input clock, sample the input data, generate the output clock and generate the output data for the V.24 interface. Upon performing the initialization process as described above the process ends in step S360.

Figure 3B:
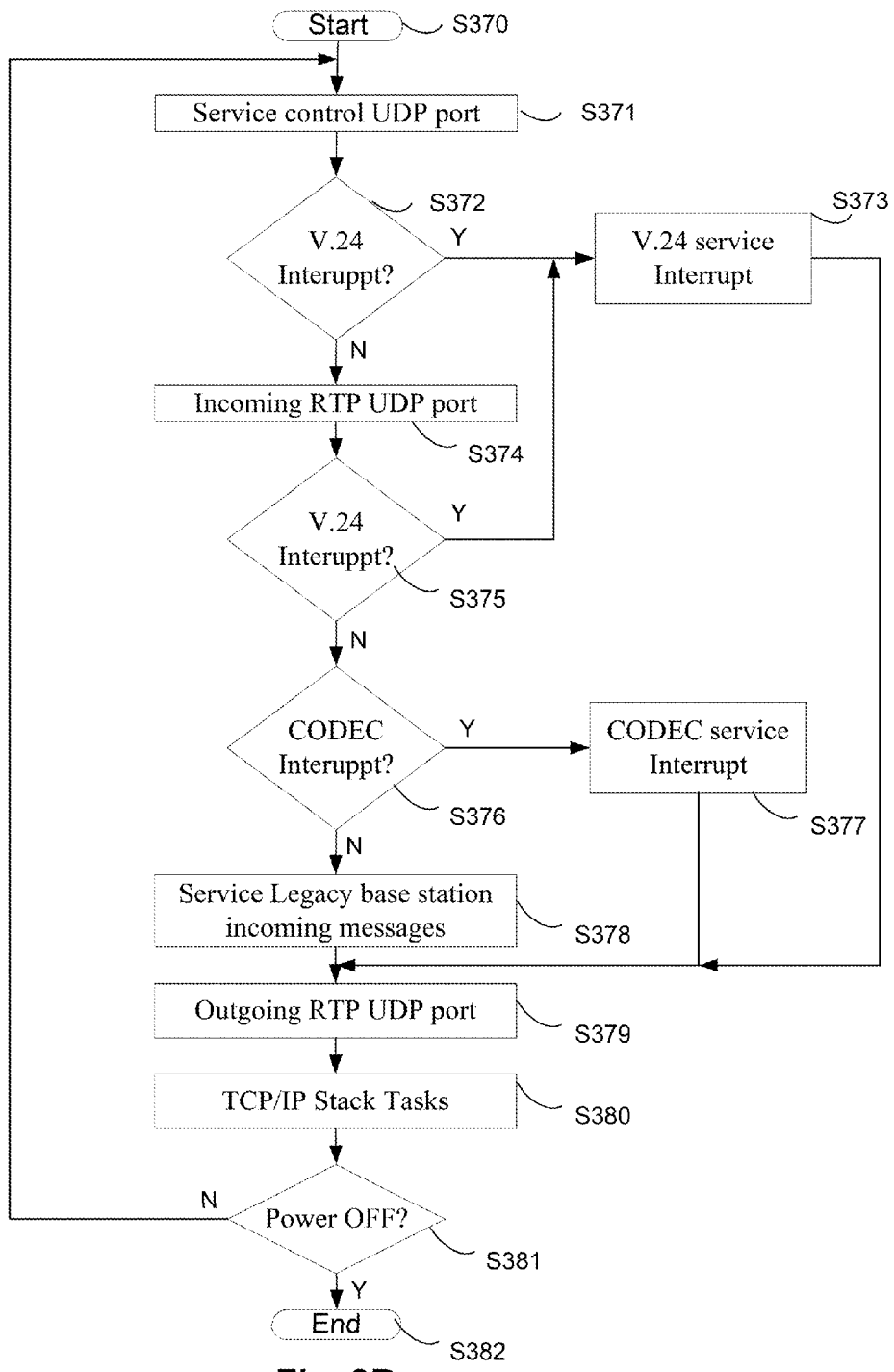
FIG. 3B is a flowchart depicting the implementation steps performed by the firmware.

FIG. 3B is a flowchart depicting the implementation steps performed by the firmware. The process starts in step S370 and proceeds to step S371.

In step S371, the process determines if a control UDP port is required to be established for control purposes. For instance, if a connect command is received (from a dispatch console), a designated UDP control port is established. After opening the port, a service control port function exchanges heartbeat messages with the connected dispatch console on predetermined intervals. Heartbeat messages are sent to the dispatch console in order to enable the dispatch console to identify if and when the FSI is operational. Further, in step S371, the FSI responds to any command received from the dispatch console, as well as transmits/receives SBC-based messages. Furthermore, separate IP addresses/port numbers can be established for control, data and voice functions.

The process then proceeds to step S372, wherein a query is made to check if a V.24 interrupt signal has been detected. If the response to the query is affirmative the process moves to step S373, else if the response is negative, the process moves to step S374.

In Step S373, the fast interrupt is used to sample the input clock, sample the input data, generate the output clock and generate the output data for the V.24 interface, wherein after the process proceeds to step S379 to transmit the data.

In step S374, incoming real time protocol (RTP)-UDP ports are checked to determine if a voice message has been received from the dispatch console terminal. If a Project 25 voice or data message has been received, the message is read, converted into a format acceptable for the legacy base station and is stored in a circular data buffer for sending to the base station. The data buffer allows a certain amount of latitude in the receiving and sending data rates/timing without causing disruptions in the intended communications. For instance, in the case of the V.24 interface, the data is transferred on a bit by bit basis in synchronism with the generated 9,600 Hertz clock. If there is no data waiting in the buffer to be sent, an idle pattern is sent. In the case of analog PCM, the incoming RTP packets are converted to 160, 8 bit samples, and sent to a circular buffer connected in firmware to a CODEC transmit function. Furthermore, a transmit key acknowledgment can also generated and sent back to the dispatch console via UDP messaging.

The process then moves to step S375, wherein a query is made to determine if a V.24 interrupt signal is identified. If the response to the query is affirmative, the process loops back to step S373. If the response is negative, the process moves to step S376, wherein another query is made to determine if a CODEC interrupt is identified.

If the response to the query in step S376 is affirmative, the process moves to step S377, else the process moves to step S378.

In step S377, the CODEC (included in the FSI) converts analog wireline signals to digital form at a crystal controlled rate of 8,000 per second, wherein after the process moves to step S379. The controlled rate also serves as a timing reference for the FSI.

In step S378, incoming messages from the base station are checked to determine if any complete messages are available. The incoming messages are processed to remove data replacements inherent in the V.24 interface and are integrity checked using a 16 bit Cyclic Redundancy Checksum (CRC). The complete checked messages are processed and depending on the type of the message, are sent to an appropriate FSI module as indicated below. For heartbeat/continuity messages, an appropriate response is generated and placed in the circular buffer for transmission to the base station. In the case of Project 25 voice messages and Data messages, the message is sent to a Format/Send Outgoing UDP Message module which transmits the message (via a UDP port) as depicted in step S379.

Note that the message is reformatted into a TIA-102.BAHA or Draft TIA-102.BAHA-A format and sent via the appropriate UDP port to the intended IP address. For analog PCM messages, the PCM data is transferred from the CODEC circular buffer, compressed to 8 bit words using G.711 compression, formatted into a UDP packet along with appropriate headers and sent to the dispatch console. Furthermore in this step, the process may also include the insertion of start of stream and end of stream messages.

In step S380, TCP/IP stacks are processed. In this step, the process serves the web pages stored in the SPI Flash memory as well as provides a means to upload web page files and firmware update files to the SPI Flash via TCP/IP. Once a file is uploaded, a separate upload of a 256 bit cryptographic message digest computed across the entire file using a shared secret key must be uploaded. If the uploaded message digest does not exactly match the value calculated by the upload function, the file is discarded and not loaded in place of the existing web pace or firmware file. Further, according to an embodiment, if the message digest calculated values matched the received value, a flag is written into a sector of the program memory and a microcontroller reset is forced, wherein the initialization process of FIG. 3A may be executed.

In step S381, the process queries if a power supply is OFF. If the response to the query is negative, the process loops back to S371 to repeat the above steps. If the response to the query in step S381 is affirmative the process simply ends (step S382).

In what follows, is provided a detailed description according to an embodiment, of a technique that enables reading V.24 messages produced by a legacy base station equipment and writing V.24 messages that, when sent to the legacy base station equipment, would produce the desired action.

Initially, a V.24 message is first read by FSI. The V.24 is a protocol that is in wide use by several legacy base stations and utilizes a High-Level Data Link Control protocol (HDLC) to synchronously transfer data. The HDCL protocol fully describes the content of V.24 messages including a 16 bit Cyclic Redundancy Check (CRC) that makes up the last two bytes of each message as well as the way that the start and end of each message is indicated. As stated previously, a key element of the HDLC is the avoidance of sending more than 5 "1" bits in a message by intentionally "stuffing" a "0" bit into the data stream after each string of 5 "1" bits. This stuff bit is taken out of the data stream at the receiver end to recover the intended data. The exception to this bit-stuffing rule is signaling the end of a message, wherein a "0" bit, six "1" bits and a 0" bit stream (0x7E) are sent to indicate to the receiver that the message is complete. The 0x7E pattern is also sent when the link is not transferring messages and can be thought of as an idle byte. The first non-0x7E byte received after an idle byte signals the start of the next message. Using the above information, a program that is embedded in the FSI microcontroller can read the V.24 messages and display the individual messages as hexadecimal characters on a computer monitor. Further, the data rate (9,600 per second) can be determined by monitoring the clock lines in either direction on the V.24 port. Once the V.24 output can be read, the FSI translates the V.24 messages to IP compliant messages. Note that the FSI can be configured to translate a Project 25 (a digital communications system in wide use with First Responder organizations) voice data frame, Project 25 data and a single block control (i.e., SBC messages such as truncking control) messages to an IP compliant format.

Figure 4:
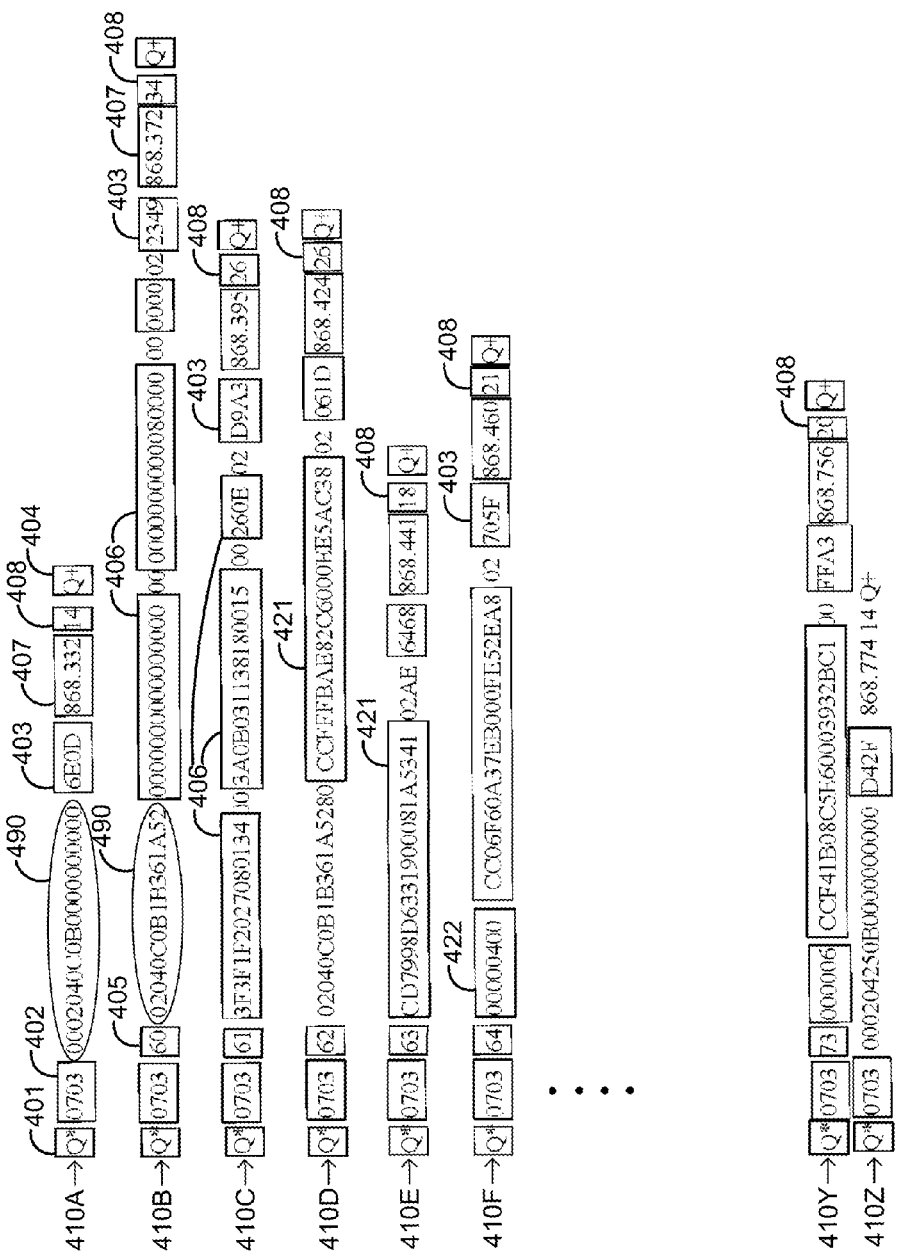
FIG. 4 depicts a mapping performed by the FSI of a V.24 message from a base station to an Internet-Protocol based compatible message.

FIG. 4 illustrates a pictorial representation depicting the transformation of V.24 messages that are read out from the V.24 port of a legacy base station, to an internet protocol based compatible messages.

Specifically, FIG. 4 represents Project 25 voice messages in hexadecimal notation. The voice and data messages utilized over-the-air (common air interface) in Project 25 communications systems are defined in the open standard ANSI/TIA/EIA-102 BAAA "Project 25 FDMA Common Air Interface", incorporated by reference herein. The formats for voice connection of fixed station equipment (base stations) to a dispatch console are defined in a second open standard TIA-102.BAHA and Draft TIA-102.BAHA-A "Project 25 Fixed Station Interface Messages and procedures", incorporated by reference herein.

The Project 25 voice messages include a transmit key-up command (410A), a header data unit 1 command (410B), a header data unit 2 (410C), voice frames (410D-410Y) and transmit key down commands 410Z. The voice messages include header data blocks 406, Vocoder data 421, link control/encryption synchronization/low speed data 422, a sixteen bit CRC code 403, a frame identifier 405, and a start of data unit identifier (0703) 402.

Further, the FSI while performing the transformation may include redundant indicators such as a formatting indicator (Q*) 401, a time stamp 407 to ensure that messages are being received for example every 20 milli-seconds, a check indicator (Q+) 404 to indicate that that the CRC read matches the calculated value based on the message contents. Further, the FSI may include an indicator denoting a number of message bytes 408 in each message received from the V.24 port.

The frame type numbering (405) is identical to that contained in the TIA-102.BAHA as shown in Table I. Specifically, the voice frame numbers (62, 63, . . . . . 73, shown in Table I) of the TIA-102.BAHA, match exactly to those of the voice messages received over the V.24 port of the base station.

In a similar manner, the V.24 frame content including the header data units 1 and 2 (406), Vocoder data (421), link control/encryption synchronization/low speed data (422) map directly to portions of an IP complaint protocol (such as a user datagram protocol (UDP) as defined in the TIA-102.BAHA). For instance, the Header Data Unit 1 and 2 messages in the capture (FIG. 4) match the content and format in TIA-102.BAHA, as shown in sections 8.2.2.7 and 8.4.2.8. Furthermore, the FSI detects portions of the V.24 messages such as fixed content message portions (represented by ellipses 490 in FIG. 4) that are not essential to the BAHA standard and thus discards these message portions.

Table I: Common Air Interface Frame Types of TIA-102.BAHA
Name PID/FT Description
IMBEFRAME1 $62 IMBE Voice 1
IMBEFRAME2 $63 IMBE Voice 2
IMBEFRAME3 $64 IMBE Voice 3+Link Control
IMBEFRAME4 $65 IMBE Voice 4+Link Control
IMBEFRAME5 $66 IMBE Voice 5+Link Control
IMBEFRAME6 $67 IMBE Voice 6+Link Control
IMBEFRAME7 $68 IMBE Voice 7+Link Control
IMBEFRAME8 $69 IMBE Voice 8+Link Control
IMBEFRAME9 $6A IMBE Voice 9+Low Speed Data
IMBEFRAME10 $6B IMBE Voice 10
IMBEFRAME11 $6C IMBE Voice 11
IMBEFRAME12 $6D IMBE Voice 12+Encryption Sync
IMBEFRAME13 $6E IMBE Voice 13+Encryption Sync
IMBEFRAME14 $6F IMBE Voice 14+Encryption Sync
IMBEFRAME15 $70 IMBE Voice 15+Encryption Sync
IMBEFRAME16 $71 IMBE Voice 16+Encryption Sync
IMBEFRAME17 $72 IMBE Voice 17+Encryption Sync
IMBEFRAME18 $73 IMBE Voice 18+Low Speed Data According to another embodiment, the Project 25 over-the-air data formats for both confirmed and unconfirmed data (as defined by ANSI/TIA/DA-102.BAAA) as well as single block control messages can be mapped into the V.24 HDCL messages in a manner similar as that of voice messages as depicted in FIG. 4.

Furthermore, the above described FSI can include multiple interfaces that can be supported within the firmware with the specific interface selected remotely via a web page browser interface. The reference hardware/firmware described above is not the only possible embodiment of the invention. Other possible embodiments include use of a general purpose microcontroller or processor, use of an operating system such as Linux, Windows, etc. and use of a general purpose computer platform such as a server, laptop, desktop or single board computer.

Figure 5:
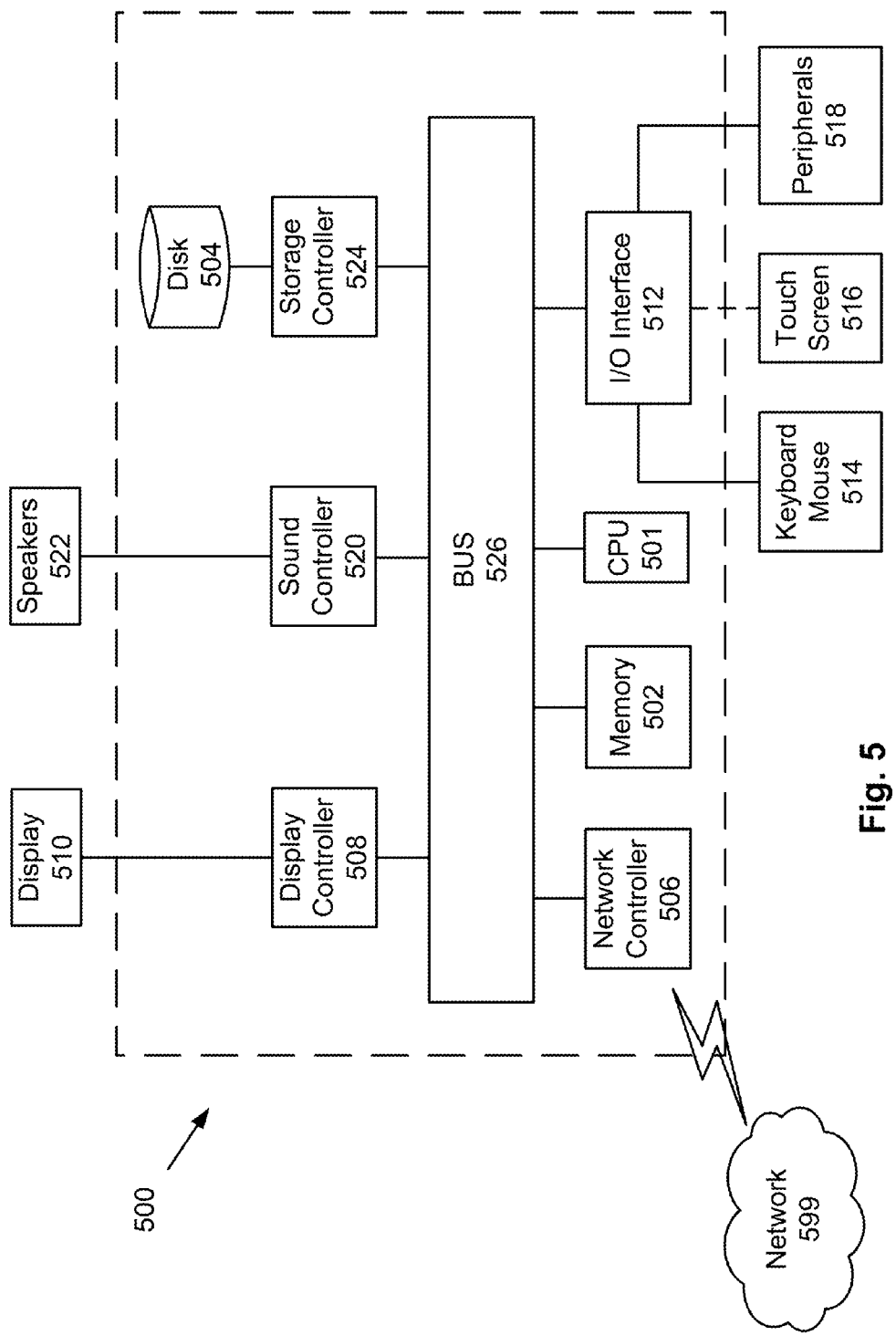
FIG. 5 illustrates a block diagram of a computing device according to an embodiment.

FIG. 5 illustrates a block diagram of a computing device 500 according to an embodiment. In FIG. 5, the computer 500 includes a CPU 501 which performs the processes described above. The process data and instructions may be stored in memory 502. These processes and instructions may also be stored on a storage medium disk 504 such as a hard drive (HDD) or portable storage medium or may be stored remotely. Further, the claimed advancements are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the system communicates, such as a server or computer.

Further, the claimed advancements may be provided as a utility application, background daemon, or component of an operating system, or combination thereof, executing in conjunction with CPU 501 and an operating system such as Microsoft Windows 7, UNIX, Solaris, LINUX, Apple MAC-OS and other systems known to those skilled in the art.

CPU 501 may be a Xenon or Core processor from Intel of America or an Opteron processor from AMD of America, or may be other processor types that would be recognized by one of ordinary skill in the art. Alternatively, the CPU 500 may be implemented on an FPGA, ASIC, PLD or using discrete logic circuits, as one of ordinary skill in the art would recognize. Further, CPU 501 may be implemented as multiple processors cooperatively working in parallel to perform the instructions of the inventive processes described above.

The computer 500 in FIG. 5 also includes a network controller 506, such as an Intel Ethernet PRO network interface card from Intel Corporation of America, for interfacing with network 599. As can be appreciated, the network 599 can be a public network, such as the Internet, or a private network such as an LAN or WAN network, or any combination thereof and can also include PSTN or ISDN sub-networks. The network 599 can also be wired, such as an Ethernet network, or can be wireless such as a cellular network including EDGE, 3G and 4G wireless cellular systems. The wireless network can also be Wi-Fi, Bluetooth, or any other wireless form of communication that is known.

The computer 500 further includes a display controller 508, such as a NVIDLA GeForce GTX or Quadro graphics adaptor from NVIDIA Corporation of America for interfacing with display 510, such as a Hewlett Packard HPL2445w LCD monitor. A general purpose I/O interface 512 interfaces with a keyboard and/or mouse 514 as well as a touch screen panel 516 on or separate from display 510. General purpose I/O interface also connects to a variety of peripherals 518 including printers and scanners, such as an OfficeJet or DeskJet from Hewlett Packard.

A sound controller 520 may also be provided in the computer 599, such as Sound Blaster X-Fi Titanium from Creative, to interface with speakers/microphone 522 thereby providing sounds and/or music. The speakers/microphone 522 can also be used to accept dictated words as commands for controlling the robot-guided medical procedure system or for providing location and/or property information with respect to the target property.

The general purpose storage controller 524 connects the storage medium disk 304 with communication bus 526, which may be an ISA, EISA, VESA, PCI, or similar, for interconnecting all of the components of the robot-guided medical procedure system. A description of the general features and functionality of the display 510, keyboard and/or mouse 514, as well as the display controller 508, storage controller 524, network controller 506, sound controller 520, and general purpose I/O interface 512 is omitted herein for brevity as these features are known.

While aspects of the present disclosure have been described in conjunction with the specific embodiments thereof that are proposed as examples, alternatives, modifications, and variations to the examples may be made. Accordingly, embodiments as set forth herein are intended to be illustrative and not limiting. There are changes that may be made without departing from the scope of the claims set forth below.

What is claimed is:

1. A fixed station interface for a base station comprising:
   a plurality of interfaces configured to perform serial communication with the base station; and
   circuitry configured to
      upload remotely via a web browser a set of instructions to operate the plurality of interfaces,
      determine an operational channel for a first interface of the plurality of interfaces to communicate with the base station,
      receive on the first interface, a message in a V.24 format that is supported by the base station and that is to be transformed into a BAHA format,
      determine portions of the received message that are to be discarded prior to transformation into the BAHA format, and portions of the received message that are to be maintained for transformation into the BAHA format, the discarded portions of the received message being portions that do not map into the BAHA format, and that have a fixed length, which is dependent on a type of the received message, wherein the type of the received message is one of a transmit key-up message, a header data-unit message, a voice message, or a transmit key-down message, and
      transform only the maintained portions of the received message in the V.24 message format into the BAHA format, by mapping at least one of a first portion, a second portion, a third portion and a fourth portion of the maintained portions to corresponding portions of the message in the BAHA format.

2. The fixed station interface of claim 1, wherein the first interface is a V.24 interface and the message in the V.24 format includes a High-Level-Data-Link-Control protocol for synchronously transferring the message.

3. The fixed station interface of claim 2, wherein the V.24 interface is a synchronous serial bi-directional interface that operates at 9600 bits per second.

4. The fixed station interface of claim 1, wherein the received message is one of a Project 25 encrypted/unencrypted voice including low speed data, link control and encryption synchronization information, a Project 25 data message and a single block control message.

5. The fixed station interface of claim 1, wherein the BAHA format of the message includes the message in one of a user datagram protocol (UDP) format and an Internet-Protocol (IP) format.

6. The fixed station interface of claim 1, wherein the first portion of the maintained portions of the message is a frame identifier that is 1 byte long, the second portion of the maintained portions of the message is Vocoder data that is 11 bytes long, the third portion of the maintained portions of the message is link control/encryption synchronization/low speed data information that is four bytes long and the fourth portion of the maintained portions of the message is a cyclic redundancy code information that is 2 bytes long.

7. The fixed station interface of claim 1, wherein the circuitry is further configured to:
   establish a control port with an externally connected equipment; and
   transmit heartbeat messages to the external equipment to indicate that the fixed station interface is operational.

8. The fixed station interface of claim 1, further comprises:
   a wireline analog interface configured to receive analog pulse code modulated signal; and
   a CODEC configured to convert the received analog signal to a digital signal.

9. The fixed station interface of claim 1, wherein the circuitry is further configured to:
   include a time-stamp for each received message to ensure that a plurality of messages of the V.24 format are being received at a pre-determined time interval; and
   insert an indicator denoting the number of bytes of message received.

10. The fixed station interface of claim 1, wherein the circuitry is further configured to perform a cyclic redundancy check to ensure that the message is received without errors.

11. The fixed station interface of claim 1, wherein the plurality of interfaces include an RS232 interface, a V.24 interface and a wireline interface, and the circuitry is a PIC-32 microcontroller.

12. A method of operating a fixed station interface for a base station, the method comprising:
   uploading remotely, via a web browser, a set of instructions to operate a plurality of interfaces of the fixed station interface;
   determining an operational channel for a first interface of the plurality of interfaces to communicate with the base station;
   receiving on the first interface, a message in a V.24 format that is supported by the base station and that is to be transformed into a BAHA format;
   determining portions of the received message that are to be discarded prior to transformation into the BAHA format and portions of the received message that are to be maintained for transformation into the BAHA format, the discarded portions of the received message being portions that do not map into the BAHA format, and that have a fixed length, which is dependent on a type of the received message, wherein the type of the received message is one of a transmit key-up message, a header data-unit message, a voice message, or a transmit key-down message; and
   transforming only the maintained portions of the received message in the V.24 message format into the BAHA format, by mapping at least one of a first portion, a second portion, a third portion and a fourth portion of the maintained portions to corresponding portions of the message in the BAHA format.

13. The method of operating a fixed station interface of claim 12, further comprising:
   establishing a control port with an externally connected equipment; and
   transmitting heartbeat messages to the external equipment to indicate that the fixed station interface is operational.

14. The method of operating a fixed station interface of claim 12, further comprising
   including a time-stamp for each received message to ensure that a plurality of messages of the V.24 format are being received at a pre-determined time interval; and
   inserting an indicator denoting the number of message bytes received.

15. The method of operating a fixed station interface claim 12, further comprising
   receiving, analog pulse code modulated signal on a wireline analog interface; and converting, by a CODEC, the received analog signal to a digital signal.

16. A non-transitory computer readable medium having stored thereon a program that, when executed by a computer, causes the computer to perform a method of operating a fixed station interface for a base station, the method comprising:

uploading remotely, via a web browser, a set of instructions to operate a plurality of interfaces of the fixed station interface;

determining an operational channel for a first interface of the plurality of interfaces to communicate with the base station;

receiving on the first interface, a message in a V.24 format that is supported by the base station and that is to be transformed into a BAHA format;

determining portions of the received message that are to be discarded prior to transformation into the BAHA format and portions of the received message that are to be maintained for transformation into the BAHA format, the discarded portions of the received message being portions that do not map into the BAHA format, and that have a fixed length, which is dependent on a type of the received message, wherein the type of the received message is one of a transmit key-up message, a header data-unit message, a voice message, or a transmit key-down message; and transforming only the maintained portions of the received message in the V.24 message format into the BAHA format, by mapping at least one of a first portion, a second portion, a third portion and a fourth portion of the maintained portions to corresponding portions of the message in the BAHA format.

17. The non-transitory computer readable medium of claim 16, further comprising:

establishing a control port with an externally connected equipment; and transmitting heartbeat messages to the external equipment to indicate that the fixed station interface is operational.

18. The non-transitory computer readable medium of claim 16, further comprising:

including a time-stamp for each received message to ensure that a plurality of messages of the V.24 format are being received at a pre-determined time interval; and inserting an indicator denoting the number of message bytes received.

19. The non-transitory computer readable medium of claim 16, further comprising:

receiving, analog pulse code modulated signal on a wireline analog interface; and converting, by a CODEC, the received analog signal to a digital signal.

* * * * *